United States Patent [19]
Oshino

[11] Patent Number: 5,196,679
[45] Date of Patent: Mar. 23, 1993

[54] METHOD AND APPARATUS FOR PRINTING AND READING ELECTRONICALLY READABLE INDICIA, BY SHIFTING A SCANNER POSITION DURING SCANNING

[75] Inventor: Genzi Oshino, Miyagi, Japan

[73] Assignee: Tohoku Ricoh Co., Ltd., Miyagi, Japan

[21] Appl. No.: 859,241

[22] Filed: Mar. 26, 1992

Related U.S. Application Data

[63] Continuation of Ser. No. 460,473, Jan. 3, 1990, abandoned.

[30] Foreign Application Priority Data

Jan. 31, 1989 [JP] Japan .................................. 1-22066

[51] Int. Cl.⁵ ........................ G06K 7/015; G06K 7/10
[52] U.S. Cl. .................................... 235/437; 235/432; 235/462

[58] Field of Search ............... 235/432, 433, 437, 438, 235/454, 462; 346/76 PH; 400/74, 103

[56] References Cited

U.S. PATENT DOCUMENTS

| | | | |
|---|---|---|---|
| 4,339,208 | 7/1982 | Biedermann | 400/74 |
| 4,349,741 | 9/1982 | Bobart et al. | 400/103 |
| 4,587,411 | 5/1986 | Orstfelder et al. | 346/76 PH |
| 4,699,531 | 10/1987 | Ulinski, Sr. | |
| 4,795,281 | 1/1989 | Ulinski et al. | 400/74 |

Primary Examiner—Robert Weinhardt
Attorney, Agent, or Firm—Armstrong, Westerman, Hattori, McLeland & Naughton

[57] ABSTRACT

An indicia printing/verifying apparatus and an indicia scanning method are disclosed, in which a scanner is shifted in the line feed direction while indicia is scanned by the scanner so that even the indicia having a small length in the line feed direction can be completely scanned by the scanner without decreasing the printing-/verifying speed of the apparatus.

7 Claims, 4 Drawing Sheets

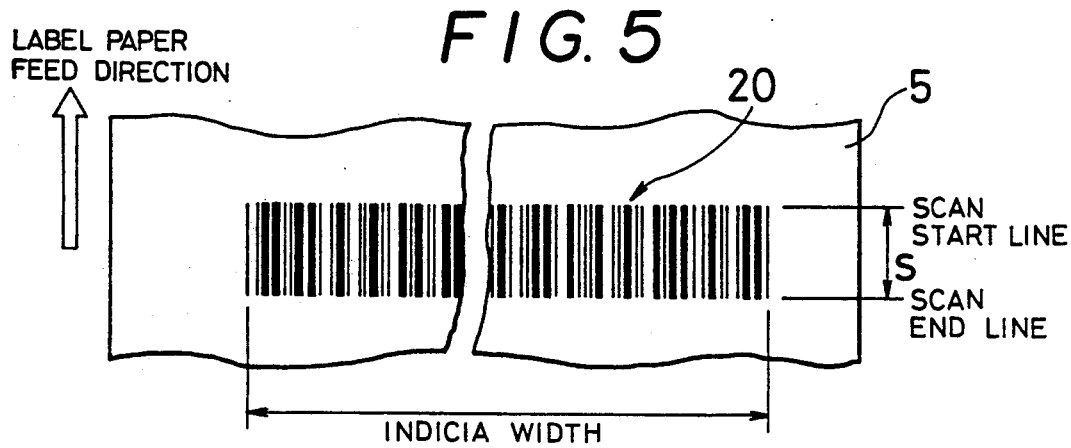
FIG. 5
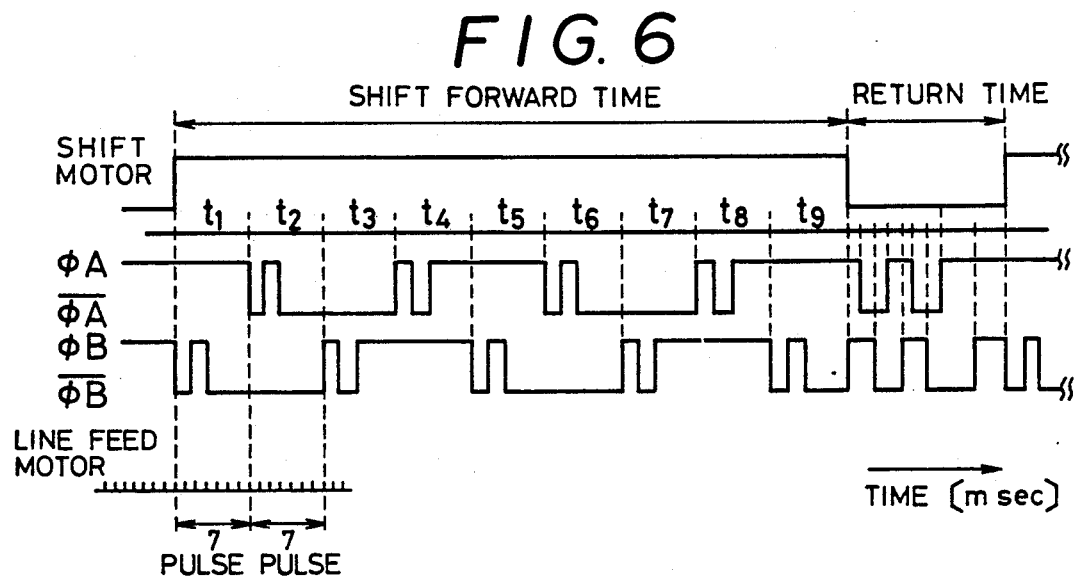
FIG. 6
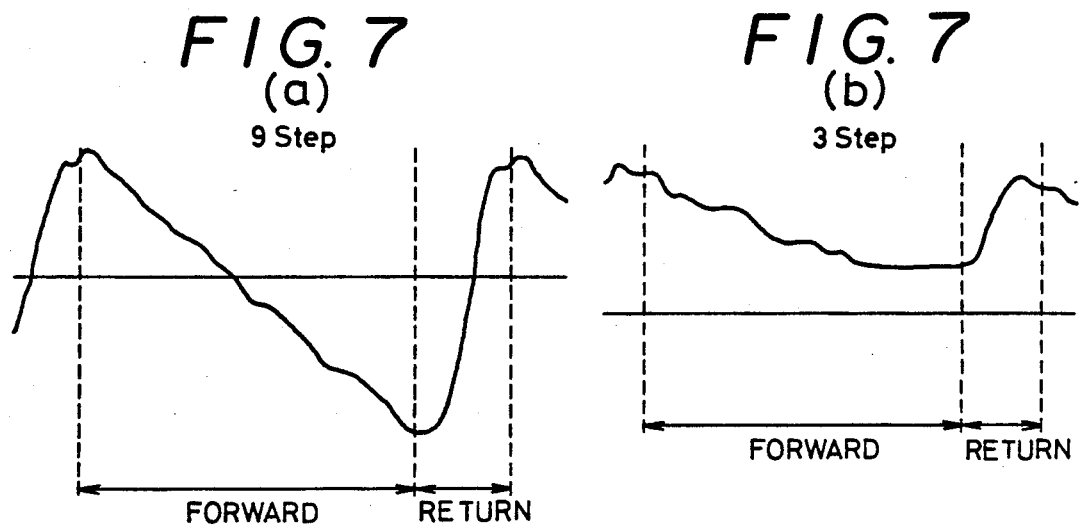
FIG. 7 (a) 9 Step
FIG. 7 (b) 3 Step

METHOD AND APPARATUS FOR PRINTING AND READING ELECTRONICALLY READABLE INDICIA, BY SHIFTING A SCANNER POSITION DURING SCANNING

This application is a continuation of application Ser. No. 460,473 filed Jan. 3, 1990 now abandoned.

BACKGROUND OF THE INVENTION

1. Field of the Invention

The present invention relates to an indicia printing-/verifying apparatus having a self-verifying function, such as a bar code printer, and an indicia scanning method thereof.

2. Description of the Prior Art

As disclosed in U.S. Pat. No. 4,699,531, an indicia printing/verifying apparatus has been available, which is designed to print indicia, such as bar code, on a sheet of paper by using a print head, e.g., a thermal head, and to subsequently read the indicia using a scanner so as to verify the print result of the indicia.

In order to prevent a decrease in printing speed, this apparatus is designed to scan printed indicia by moving the scanner in a direction perpendicular to the line feed direction while performing line feed.

In such a conventional indicia scanning method, however, when the line feed speed (printing speed) is represented by v; the scanning time of the scanner, t; and the length of an indicia to be scanned in the line feed direction, l, the entire indicia cannot be scanned unless the relation indicated below is satisfied:

$$l \geq v \times t \qquad (1)$$

According to this method, therefore, as the line feed speed (printing speed) v is increased, the scanning time t must be shortened. In order to shorten the scanning time t, a carriage drive motor for moving the scanner is required to have a large output. However, when a drive motor having a large output is used, the cost is increased, and the power consumption is greatly increased because of the motor.

If scanning is performed without performing line feed, since relation (1) need not be satisfied, the length l of indicia in the line feed direction can be increased. However, if the apparatus is designed in this manner, its printing/verifying speed (throughput) is decreased.

SUMMARY OF THE INVENTION

The present invention has been made in consideration of the above situation, and has as its object to provide an indicia printing/verifying apparatus and an indicia scanning method, wherein even if the length l of indicia to be printed in the line feed direction is defined as $l < v \times t$ (v: printing speed; t: scanning time), the entire indicia can be scanned by a scanner without decreasing the printing/verifying speed (throughput) of the apparatus.

According to the present invention, there is provided an indicia printing/verifying apparatus comprising indicia printing means for printing indicia on paper, indicia verifying means for reading the indicia printed by the indicia printing means by scanning the indicia in a direction perpendicular to a line feed direction using a scanner, and verifying a print result of the indicia, and scanner shift means for shifting the scanner in the line feed direction while the indicia is scanned by the scanner.

In addition, according to the present invention, there is provided an indicia scanning method in an indicia printing/verifying apparatus for printing indicia on paper, reading the indicia by scanning the indicia in a direction perpendicular to a line feed direction using a scanner, and verifying a print result of the indicia, wherein the scanner is shifted in the line feed direction while the indicia is scanned by the scanner.

The above and other objects, features and advantages of the invention will be apparent from the following detailed description which is to be read in conjunction with the accompanying drawings.

BRIEF DESCRIPTION OF THE DRAWINGS

FIG. 5 is a view showing a relationship between indicia (bar code) printed on label paper 5 and the scan start and end lines of a scanner 9, and the like;

FIG. 6 is a timing chart showing a relationship between the drive timing of a shift motor 11 and the drive timing of a line feed motor for feeding the label paper 5; and FIGS. 7(a) and 7(b) are graphs showing the behavior of the scanner in the line feed direction when 9-step and 3-step drives (shifts) are performed at timings shown in FIG. 6.

DETAILED DESCRIPTION OF THE PREFERRED EMBODIMENT

An embodiment of the present invention will be described below in detail with reference to the accompanying drawings.

Figure 1:
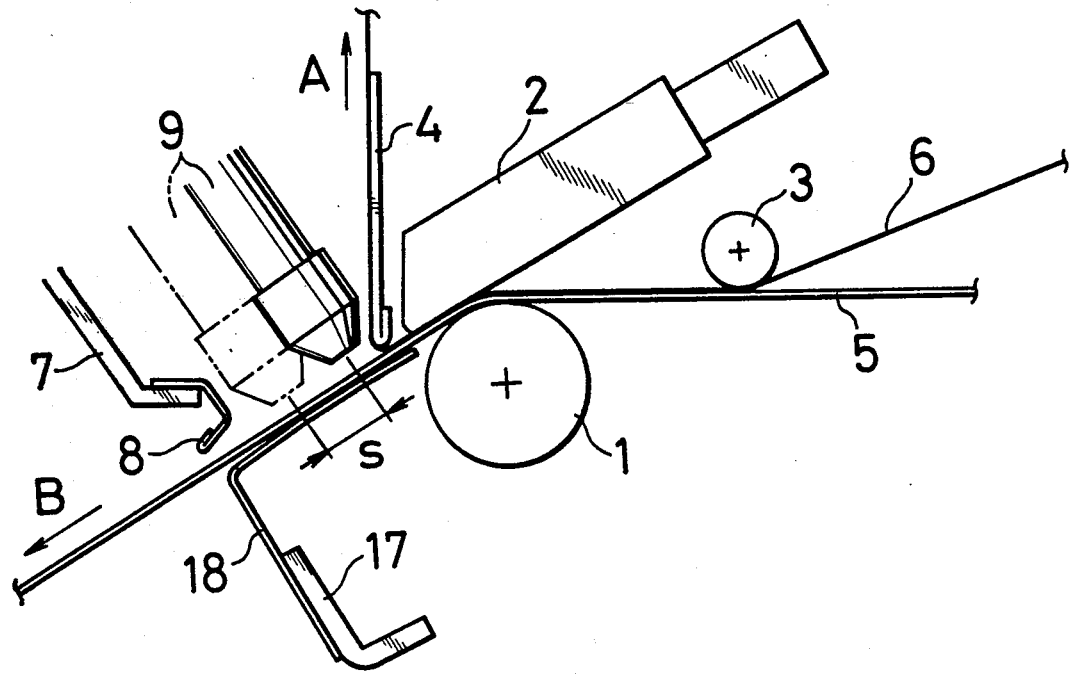
FIG. 1 is a side view showing a main part of a bar code printer according to an embodiment of the present invention.
Figure 2:
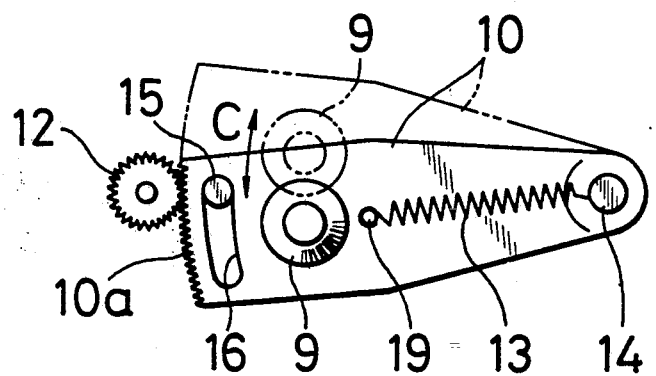
FIGS. 2 and 3 are plan and side views showing a mechanism for shifting the scanner of the bar code printer.
Figure 3:
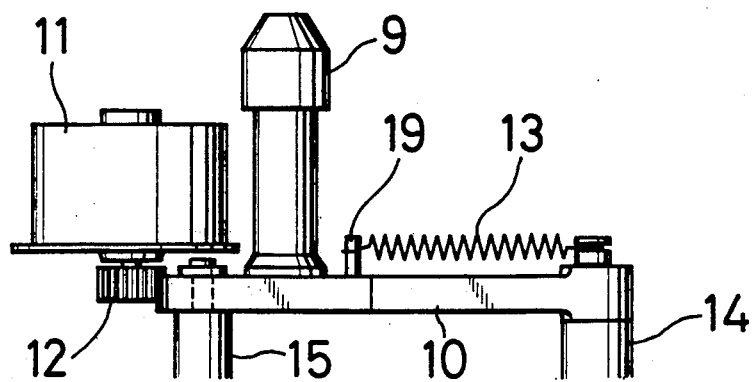

FIG. 1 is a side view showing a main part of a printer of, e.g., a bar code or the like as an indicia printing/verifying apparatus to which the present invention is applied. FIGS. 2 and 3 are plan and side views showing a mechanism for shifting the scanner of the bar code printer.

As shown in FIG. 1, the bar code printer comprises a platen 1, a thermal head 2 or the like, a ribbon guide bar 3, a ribbon peel plate 4, label paper 5, an ink ribbon 6, first and second stays 7 and 17, a label press 8, a scanner 9, and a base plate 18.

The label paper 5 is caused to overlap the ink ribbon 6 at the position of the ribbon guide bar 3, and is fed between the platen 1 and the thermal head 2. Ink of the ink ribbon 6 is transferred onto the label paper 5 by the thermal head 2. As a result, e.g., a bar code as indicia is printed.

The ink ribbon 6 is peeled off from the label paper 5 by the ribbon peel plate 4, and is fed in a direction indicated by an arrow A so as to be taken up by a take-up reel (not shown).

The label paper 5 is guided by the base plate 18, which is adjustably attached to the second stay 17 mounted on a printer body (not shown), and is fed in a direction indicated by an arrow B by the platen 1 and the thermal head 2.

During this feed operation, floating of the label paper 5 is suppressed by the label press 8 attached to the first stay 7 which is mounted on the printer body.

The scanner 9 arranged to oppose the base plate 18 is then moved by a carriage (not shown) in a direction perpendicular to the direction of the arrow B (perpendicular to the surface of the drawing). At the same time, the scanner 9 is shifted in the direction of the arrow B from a position indicated by solid lines to a position indicated by alternate long and two short dashed lines (s: shift amount). The bar code (see FIG. 5), as indicia, printed on the label paper 5 by the thermal head 2 is read by the scanner 9 in this manner, and the print result of the indicia is verified.

The scanner 9 incorporates a light source, such as an LED, for illuminating an object to be scanned, a lens for focusing the light reflected by the object, and a photodetector for receiving the focused light and outputting a signal corresponding to the amount of received light.

A shift mechanism of the scanner 9 will be described below with reference to FIGS. 2 and 3.

A shift motor 11 shown in FIG. 3 is mounted on the carriage (not shown), and a pivot shaft 14 and a support shaft 15 are fixed to the carriage. A rack 10 is pivotally attached to the pivot shaft 14.

The distal end portion of the support shaft 15 is inserted in an arcuated guide hole 16 which is formed along an arcuated toothed portion 10a of the rack 10. With this arrangement, the range in which the rack 10 swings about the pivot shaft 14 in a direction indicated by an arrow C is restricted.

A coil spring 13 for eliminating backlash between the rack 10 and the pivot shaft 14 is hooked between a pin 19 extending on the rack 10 and the distal end portion of the pivot shaft 14.

A shift gear (pinion) 12 attached to the rotating shaft of the shift motor 11 is meshed with the toothed portion 10a of the rack 10. The shift motor 11 is constituted by a stepping motor and is capable of rotating the shift gear 12 in a predetermined direction by a shift step amount and stopping it at the corresponding rotational position.

While the scanner 9 moves in a direction perpendicular to the line feed direction of the carriage (not shown) so as to scan the bar code on the label paper 5, the rack 10 is shifted from a position indicated by solid lines to a position indicated by alternate long and two short dashed lines in FIG. 2 upon step rotation of the motor 11. In accordance with this shift, the scanner 9 is shifted from a position indicated by solid lines to a position indicated alternate long and two short dashed lines by a shift amount s.

Figures 4, 4A:
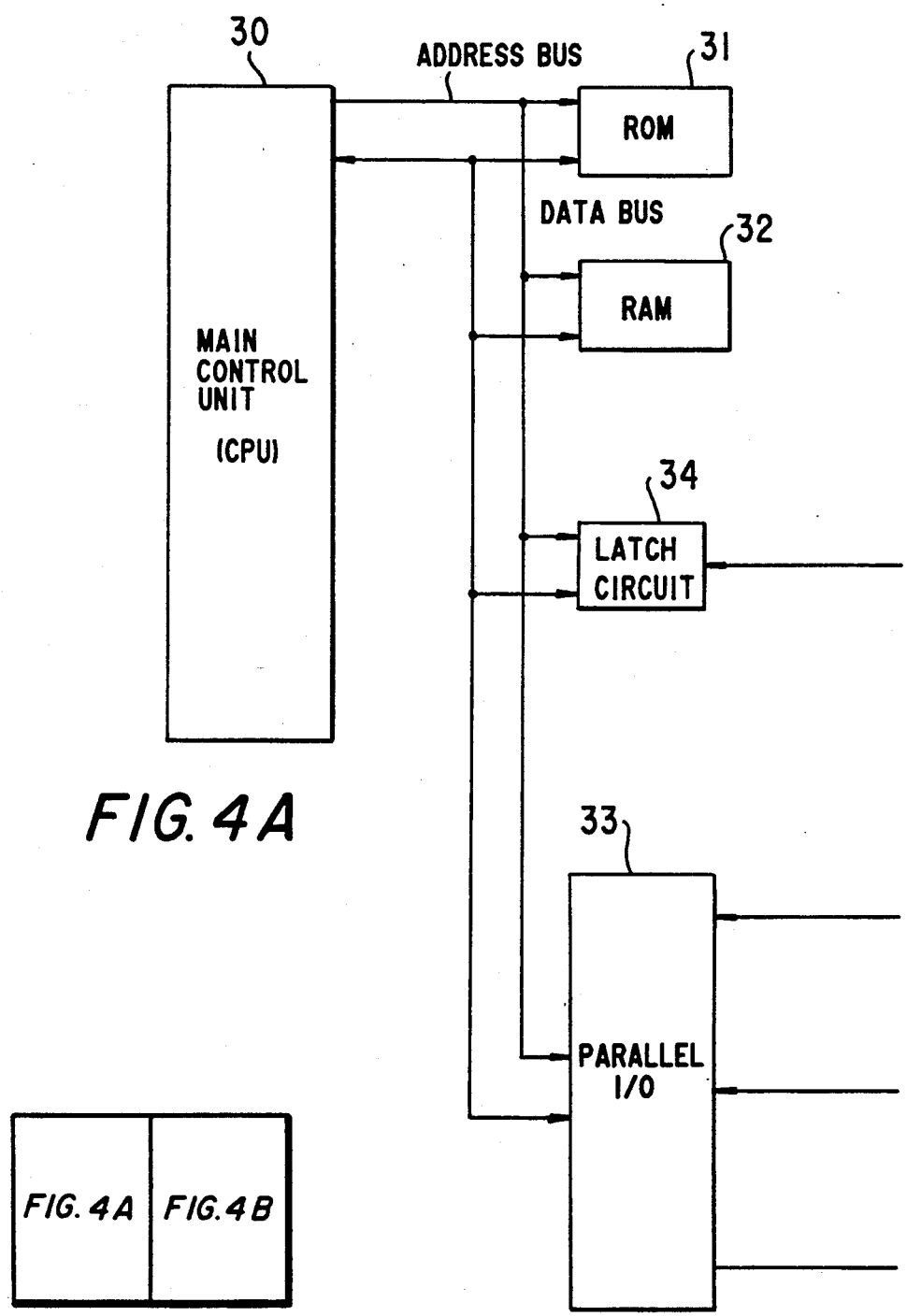
FIG. 4, consisting of 4, 4A and 4B, is a block diagram showing a schematic arrangement of an electrical section of the embodiment.
Figure 4B:
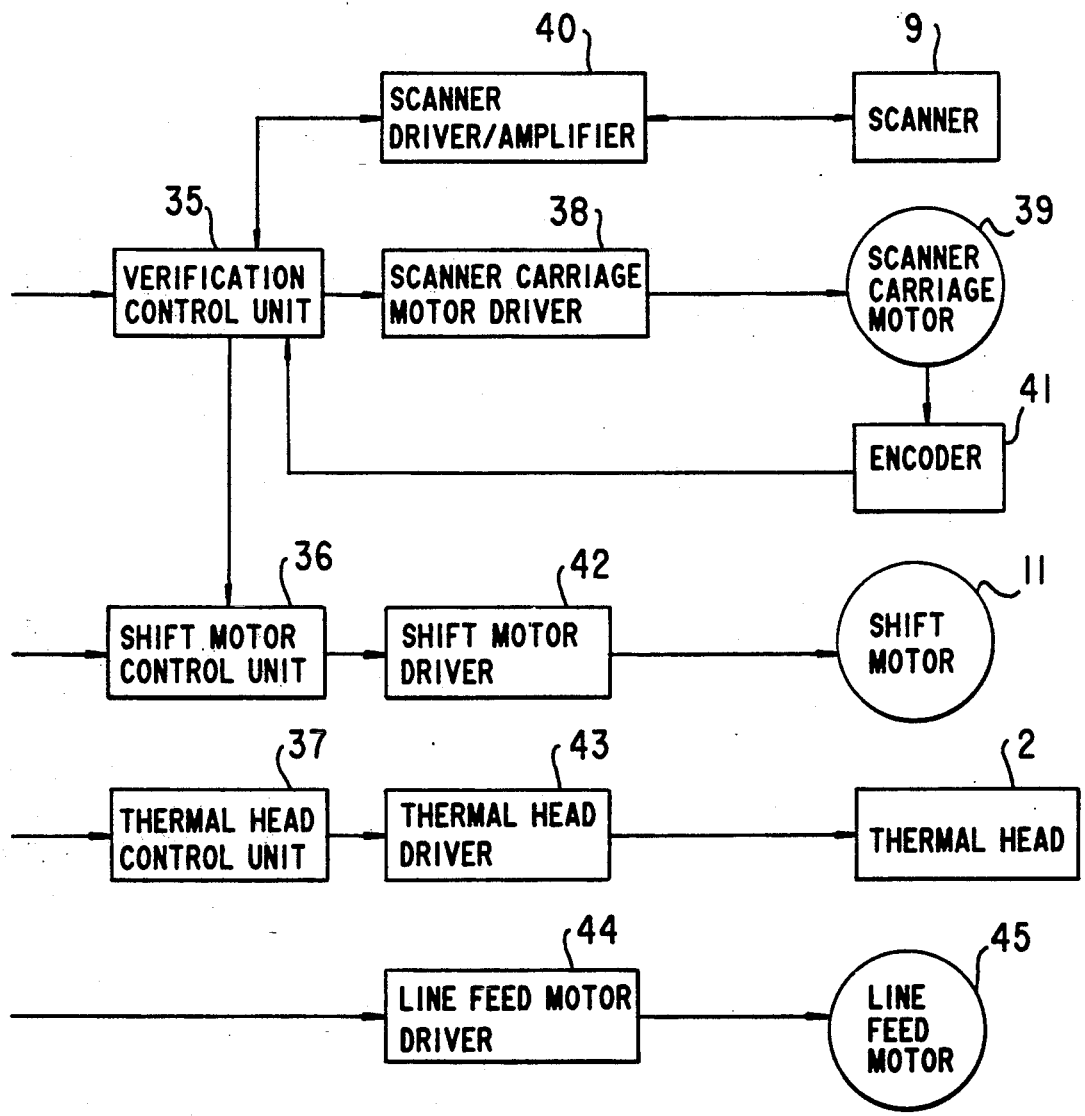

FIG. 4 is a block diagram showing a schematic arrangement of an electrical section in this embodiment.

The electrical section comprises: a verification control unit 35, a shift motor control unit 36, and a thermal head control unit 37 which are respectively controlled by a microcomputer constituted by a main control unit 30 constituted by a CPU, a ROM 31 for storing a control program for the unit 30, a RAM 32 for temporarily storing input/output data and the like, a parallel I/O (input/output control unit) 33, a latch circuit 34, and the like.

The verification control unit 35 drives a scanner carriage motor 39 through a scanner carriage motor driver 38 so as to cause the light source of the scanner 9 to emit light through a scanner driver/amplifier 40 while causing the above-described scanner 9 to move and scan from the right to the left or vice versa. In addition, the verification control unit 35 amplifies and receives a detection signal from the photodetector, and measures the number of elements and the width of each element of a bar code on a scanning span. At this time, the unit 35 determines an error in the number of elements, width errors of elements, and a state of the total width of the bar code elements on the basis of these data by using a pulse signal generated by an encoder 41 and synchronized with the rotation of the scanner carriage motor 39.

The shift motor control unit 36 drives the shift motor 11 shown in FIG. 3 through a shift motor driver 42, and controls the scanner 9 to shift in the label paper feed direction by a predetermined amount while the scanner 9 is driven by the scanner carriage motor 39 so as to scan the bar code.

The thermal head control unit 37 drives the thermal head 2 shown in FIG. 1 through a thermal head driver 43, and performs a control operation for printing a desired bar code by transferring ink of the ink ribbon 6 onto the label paper 5.

In addition, the main control unit 30 performs line feed (L/F) control in the following manner. The unit 30 supplies a signal to a line feed motor driver 44 through the parallel I/O 33 so as to drive a line feed motor 45. As a result, the platen 1 and the like shown in FIG. 1 are pivoted to feed the label paper 5 at a predetermined pitch.

FIG. 5 shows a relationship between an indicia e.g., a (bar code) printed on the label paper 5 and the scan start and end lines of the scanner 9.

Indicia (bar code) 20 is printed on the label paper 5 by the platen 1 and the thermal head 2 shown in FIG. 1, and the label paper 5 is fed. When the leading edge of the label paper 5 reaches the scan start line, a scanner carriage motor 39 is started to move the carriage in a direction perpendicular to the label paper feed direction. As a result, the indicia (bar code) 20 is scanned by the scanner 9.

During this scanning operation, the scanner 9 is shifted in the label paper feed direction by drive of the shift motor 11, and the scanning operation is completed when the trailing edge of the indicia 20 reaches the scan end line. When the shift amount of the scanner 9 in this case is s, a length l of the indicia in the label paper feed direction which can be scanned by the scanner 9 is given as:

$$l \geq v \times t - s \qquad (2)$$

Therefore, even indicia having a length l smaller than that in the conventional technique can be scanned.

If the length l and the scanning time t remain the same as those in the conventional technique, the printing speed can be increased by increasing the line feed speed v. Note that the shift speed of the scanner 9 is preferably changed in accordance with the line feed speed.

FIG. 6 shows a relationship between the drive timing of the shift motor 11 and that of the line feed motor 45 for feeding the label paper 5.

In the apparatus of this embodiment, both the motors 11 and 45 are stepping motors and are designed such that the shift motor 11 is subjected to 1-step driving when the number of shift steps of the line feed motor 45 becomes 7.

With this arrangement, even if the line feed speed varies, the scanner 9 can be shifted so as to reliably scan the indicia 20 without going past it.

FIGS. 7(a) and 7(b) respectively show the behavior of the scanner 9 in the line feed direction when 9-step and 3-step shifts are performed at the timings shown in FIG. 6.

In cases where the shift speed of the scanner 9 is constant, if the line feed speed (the feed speed of the label paper 5) is decreased, or line feed is stopped, indicia to be scanned deviates from the scanning range of the scanner 9 and scanning cannot be performed. However, if the scanner 9 is intermittently shifted at a period of a constant multiple of the line feed period as in the apparatus of this embodiment, even if the line feed speed is decreased or line feed is stopped, scanning of indicia by means of the scanner 9 can be completed.

Furthermore, even in cases where the length l of indicia to be scanned in the line feed direction is considerably small, if line feed is stopped when the indicia reaches the scan start line and scanning by means of the scanner 9 is started, since a constant multiple of the line feed period becomes infinite, the scanner 9 can complete a scanning operation without being shifted.

Note that the shift amount s of the scanner 9 is preferably changed in accordance with the length l of indicia to be scanned in the line feed direction. More specifically the shift amount s of the scanner 9 is preferably increased with an increase in l, and is decreased with a decrease in l.

Indicia is scanned and read by the scanner 9 in this manner. If results obtained by verifying indicia by using the verifying section 40 are determined to be defective, these results are classified into continuous defects of indicia and partial defects which pose no problems in practical applications.

If such a verification result is obtained, feed of the label paper 5 is stopped, and the corresponding indicia is verified again by the scanner 9 with its shift position being kept or changed. As a result, the quality and print state of the indicia can be determined. If continuous defects are found on the ribbon 6, printing is stopped to prevent continuous formation of defective indicia.

In addition, when indicia is to be verified again, scanning may be performed by feeding the label paper 5 in the reverse direction, and reversing the shift direction of the scanner.

According to the apparatus and method of the present invention, if the length of indicia to be scanned in the line feed direction is represented by l; the line feed speed (printing speed), v; and the shift amount of the scanner, s, complete scanning of indicia by means of the scanner can be performed as long as $l \geq v \times t - s$. Therefore, indicia having a length l in the line feed direction which is smaller than that in the conventional technique can be completely scanned by the scanner.

In addition, since indicia is scanned by the scanner while line feed is performed, the printing/verifying speed (throughput) of the apparatus is not decreased.

Furthermore, if the length l in the line feed direction and the scanning time t remain the same, the printing/verifying speed of the apparatus can be increased by increasing the line feed speed v.

Moreover, even if the line feed speed is changed, scanning of indicia can be reliably performed by changing the shift speed of the scanner in accordance with the line feed speed, or by intermittently shifting the scanner so as to set its shift period to be a constant multiple of the line feed period.

Note that indicia can be reliably scanned regardless of the length of indicia by changing the shift amount of the scanner in accordance with the length of indicia to be scanned in the line feed direction.

Having described an illustrative embodiment of the invention with reference to the accompanying drawings, it is to be understood that the invention is not limited to such a precise embodiment, and that various changes and modifications may be effected therein by one skilled in the art without departing from the scope and spirit of the invention as defined in the appended claims.

What is claimed is:

1. An indicia printing/verifying apparatus comprising:
    indicia printing means for printing indicia on paper perpendicular to a direction in which the paper is fed, said indicia including a plurality of elements which have a certain length in the direction in which paper is being fed;
    line feed means for feeding paper though said indicia printing means;
    indicia verifying means for reading and verifying the indicia printed by said indicia printing means by scanning the indicia in a direction perpendicular to said direction in which said paper is being fed by using a scanner, and by verifying a print result of the indicia based on the output of said scanner; and
    scanner shift means for shifting said scanner in the direction in which the paper is being fed while the indicia is scanned by said scanner, and while said paper is being fed;
    wherein said scanner shift means moves said scanner independently from said indicia printing means.

2. An apparatus according to claim 1, further comprising shift speed changing means for changing a shift speed of said scanner shifted by said scanner shift means in accordance with a line feed speed.

3. An apparatus according to claim 1, wherein said scanner shift means intermittently shifts said scanner at a period of a constant multiple of a line feed period.

4. An indicia scanning method in an indicia printing/verifying apparatus for printing indicia on paper perpendicular to a direction in which the paper is fed, said indicia including a plurality of elements which have a certain length in the direction in which paper is being fed, comprising the steps of:
    feeding the paper,
    reading the indicia by scanning the indicia in a direction perpendicular to the direction in which said paper is being fed by using a scanner, said indicia being readable by scanning in said direction perpendicular to said direction in which said paper is being fed, and
    verifying a print result of the indicia based on the output of said scanner, wherein said scanner is shifted in the direction in which said paper is being fed while the indicia is scanned by said scanner, and while said paper is being fed.

5. A method according to claim 4, wherein a shift speed of said scanner is changed in accordance with a line feed speed.

6. A method according to claim 4, wherein said scanner is intermittently shifted so as to set a period of motion of a scanner shift means to be a constant multiple of a line feed.

7. A method according to claim 4, wherein a shift amount of said scanner is changed in accordance with the length of indicia in the line feed direction.

* * * * *